US008538380B2

(12) United States Patent
Chen

(10) Patent No.: US 8,538,380 B2
(45) Date of Patent: Sep. 17, 2013

(54) METHOD OF DATA PROTECTION FOR COMMUNICATION DEVICE

(75) Inventor: Jian-Ping Chen, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 165 days.

(21) Appl. No.: 12/976,969

(22) Filed: Dec. 22, 2010

(65) Prior Publication Data

US 2012/0064941 A1 Mar. 15, 2012

(30) Foreign Application Priority Data

Sep. 14, 2010 (CN) .......................... 2010 1 0281173

(51) Int. Cl.
*H04M 1/66* (2006.01)
(52) U.S. Cl.
USPC .......................... 455/411; 455/410; 455/456.1

(58) Field of Classification Search
USPC ................................ 455/411, 456.1; 709/206
See application file for complete search history.

(56) References Cited

U.S. PATENT DOCUMENTS

| 8,036,707 | B2 * | 10/2011 | Kumar | .......................... 455/558 |
| 2007/0266099 | A1 * | 11/2007 | Wang et al. | .................... 709/206 |
| 2009/0183266 | A1 * | 7/2009 | Tan et al. | ........................ 726/35 |

* cited by examiner

*Primary Examiner* — Ajit Patel
*Assistant Examiner* — Julio Perez
(74) *Attorney, Agent, or Firm* — Altis Law Group, Inc.

(57) ABSTRACT

A method of data protection is used in a communication device. The communication may read a phone number of a subscriber identity module (SIM) card, and further determines whether the phone number conforms to a preset phone number stored in the communication device. Personal data stored in the communication device will be locked if the phone number does not conform to the preset phone number. The communication device further transmits a warning and location information of the communication device to a preset called communication device.

12 Claims, 3 Drawing Sheets

METHOD OF DATA PROTECTION FOR COMMUNICATION DEVICE

BACKGROUND

1. Technical Field

The present disclosure relates to a method of data protection for a communication device.

2. Description of Related Art

Mobile phones are popular and users are used to store privacy data in the mobile phones for convenience. Such privacy data may include address book, a short message service (SMS), and e-mail content, for example. However, the privacy data may be exposed to others if the mobile phones are lost or stolen. Therefore, the privacy data may be misappropriated for crime. The mobile phones have the potential security issue.

DETAILED DESCRIPTION

Figure 1:
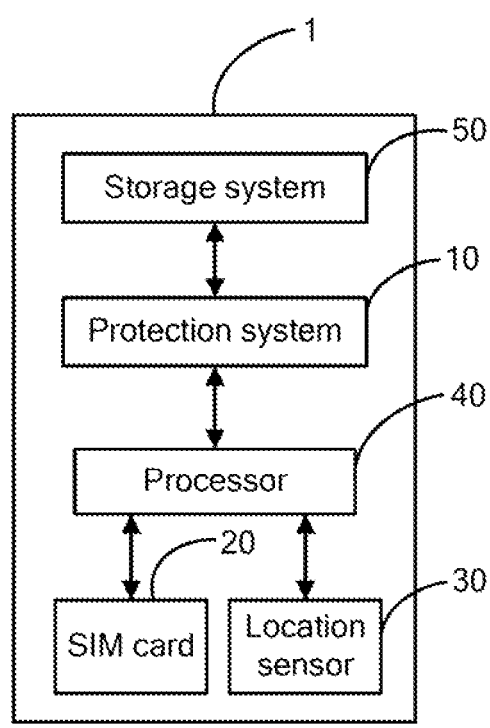
FIG. 1 is a block diagram of one embodiment of a communication device capable of receiving a subscriber identity module (SIM) card.

FIG. 1 is a block diagram of one embodiment of a communication device 1 capable of receiving a subscriber identity module (SIM) card 20. The communication device 1 may be a mobile phone or a mobile Internet device (MID), for example. The communication device 1 includes a protection system 10, a location sensor 30, a processor 40, and a storage system 50. In the embodiment, the location sensor 30 may be a GPS sensor and the storage system 50 may be a memory unit. The location sensor 30 is configured to capture location information of the communication device 1.

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 2:
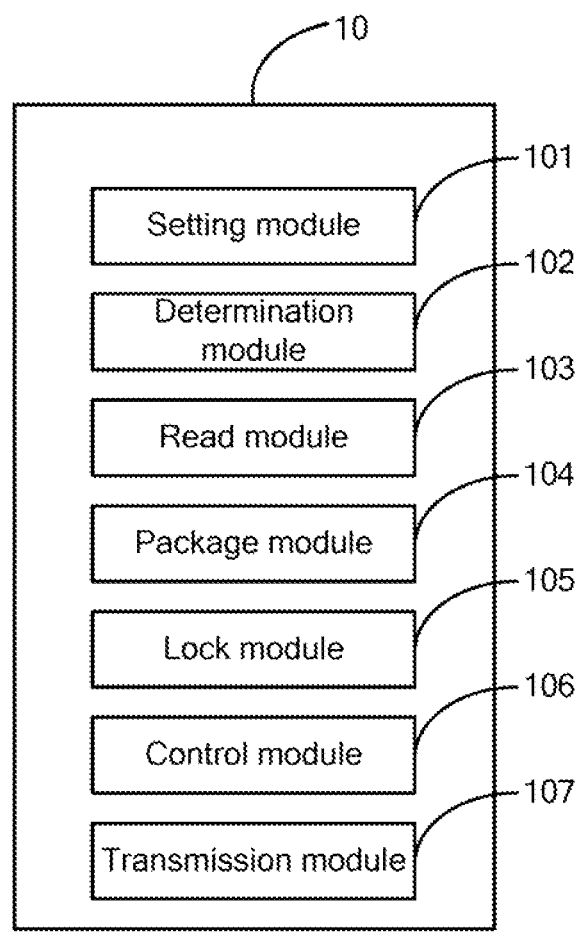
FIG. 2 is a block diagram of one embodiment of a protection system shown in FIG. 1.

FIG. 2 is a block diagram of one embodiment of the protection system 10 shown in FIG. 1. The protection system 10 is configured to protect personal data stored in the storage system 50. In the embodiment, the personal data includes data, such as an address book, a short message service (SMS), and e-mail content. The protection system 10 includes a setting module 101, a determination module 102, a read module 103, a package module 104, a lock module 105, a control module 106, and a transmission module 107. The modules 101-107 may comprise computerized code in the form of one or more programs that are stored in the storage system 50. The computerized code includes instructions that are executed by the processor 40 to provide functions for the modules 101-107.

The setting module 101 sets preset data and stores the preset data in the storage system 50 when the owner of the communication device 1 inputs a set request using an input device (not shown, such as touch screen or keypad) of the communication device 1. The preset data includes a preset phone number, a phone number of a preset called communication device of a preset called party, and a warning. The preset phone number can be a phone number of a SIM card of owner of the communication device 1. The warning can be a text message, such as "Warning! Unauthorized usage occurs in Hancock's phone!".

The determination module 102 may determine whether the preset data has been set. The read module 103 is configured to read the preset data and a phone number of the SIM card 20. The determination module 102 may further determine whether the phone number of the SIM card 20 conforms to the preset phone number.

The package module 104 is configured to package contacts information of the address book in vCard format. For example, a contact named of "Forrest Gump" has a phone number of work "(111)555-1212", a phone number of home "(404)555-1212", and E-mail "forrestgump@walladalla.com". The contact information of "Forrest Gump" can be packaged in vCard format as follows:

```
BEGIN:VCARD
VERSION:2.1
N:Gump;Forrest
FN:Forrest Gump
ORG:Gump Shrimp Co.
TITLE:Shrimp Man
TEL;WORK;VOICE:(111) 555-1212
TEL;HOME;VOICE:(404) 555-1212
ADR;WORK:;;100 Waters Edge;Baytown;LA;30314;United States of America
LABEL;WORK;ENCODING=QUOTED-PRINTABLE:100 Waters Edge=0D=0ABaytown, LA 30314=0D=0AUnited States of America
ADR;HOME:;;42 Plantation St.;Baytown;LA;30314;United States of America
LABEL;HOME;ENCODING=QUOTED-PRINTABLE:42 Plantation St.=0D=0ABaytown, LA 30314=0D=0AUnited States of America
EMAIL;PREF;INTERNET:forrestgump@walladalla.com
REV:20080424T195243Z
END:VCARD
```

The lock module 105 is configured to lock the personal data stored in the storage system 50. The personal data cannot be displayed on a display (not shown) of the communication device 1 when the personal data is locked. The control module 106 is configured to direct the location sensor 30 to capture the location information of the communication device 1. The transmission module 107 may transmit the warning and the location information to the preset called communication device over a communication network based on the preset data when the phone number of the SIM card 20 does not conform to the preset phone number.

In this situation, the transmission module 107 may further transmit the phone number of the SIM card 20 to the preset called communication device, such that the owner of the communication device 1 may understand that owner of the SIM card 20 is using the communication device 1. The transmission module 107 further transmits the contacts information of the address book to the preset called communication device using vCard format for backup requirement.

Figure 3:
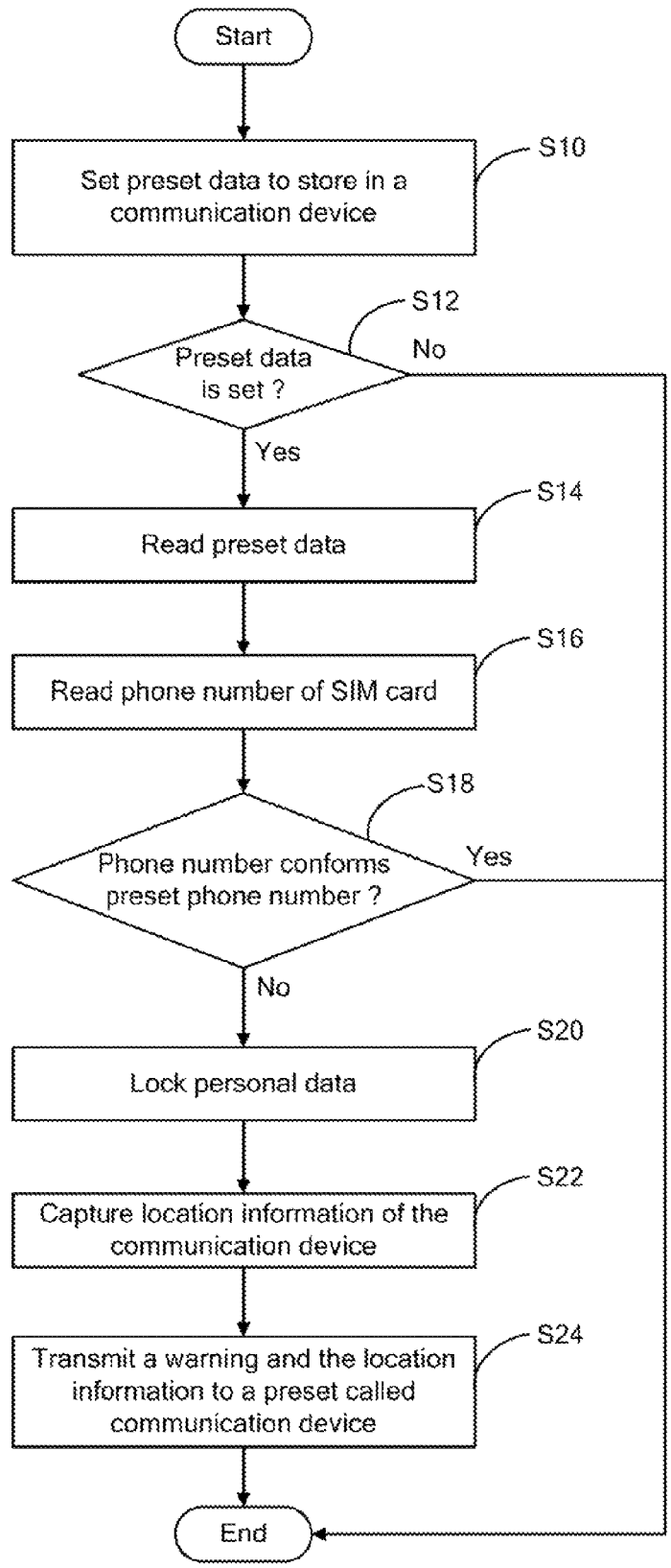
FIG. 3 is a flowchart illustrating one embodiment of a method of data protection for a communication device.

FIG. 3 is a flowchart illustrating one embodiment of a method of data protection for the communication device 1. Depending on the embodiment, additional blocks in the flow of FIG. 3 may be added, others removed, and the ordering of the blocks may be changed.

In block S10, the setting module 101 sets the preset data and stores the preset data in the storage system 50 upon the requirement of the owner of the communication device 1.

In block S12, the determination module 102 determines whether the preset data has been set. If the preset data is not set, the process is complete.

If the preset data has been set, in block S14, the read module 103 reads the preset data.

In block S16, the read module 103 reads the phone number of the SIM card 20.

In block S18, the determination module 102 determines whether the phone number of the SIM card 20 conforms to the preset phone number of the preset data. If the phone number of the SIM card 20 conforms to the preset phone number, the process is complete.

If the phone number of the SIM card 20 does not conform to the preset phone number, in block S20, the lock module 105 locks the personal data.

In block S22, the control module 106 directs the location sensor 30 to capture the location information of the communication device 1.

In block S24, the transmission module 107 transmits the warning and the location information of the communication device 1 to the preset called communication device over the communication network based on the preset data.

The present disclosure provides a method of data protection for a communication device. The security requirement of the communication device can be satisfied even if the communication device is lost or stolen.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method of data protection for a communication device, comprising:
   reading a phone number of a subscriber identity module (SIM) card received in the communication device;
   determining whether the phone number conforms to a preset phone number stored in the communication device;
   locking personal data stored in the communication device to conceal the personal data, and transmitting contacts information of address book in the personal data to a preset destination communication device, upon condition that the phone number does not conform to the preset phone number; and
   transmitting a warning and location information of the communication device to the preset destination communication device over a communication network.

2. The method of claim 1, further comprising:
   transmitting the phone number to the preset destination communication device upon condition that the phone number does not conform to the preset phone number.

3. The method of claim 2, wherein the personal data further comprises a short message service (SMS), and e-mail content.

4. The method of claim 3, wherein:
   the contacts information of the address book is transmitted to the preset destination communication device using vCard format.

5. A communication device capable of receiving a subscriber identity module (SIM) card, comprising:
   a storage system;
   at least one processor;
   one or more programs stored in the storage system and being executable by the at least one processor, the one or more programs comprising:
   a read module that reads a phone number of the SIM card received in the communication device;
   a determination module that determines whether the phone number conforms to a preset phone number stored in the storage system;
   a lock module that locks personal data stored in the storage system to conceal the personal data; and
   a transmission module that transmits contacts information of address book in the personal data to a preset destination communication device, and transmits a warning and location information of the communication device to the preset destination communication device over a communication network.

6. The communication device of claim 5, wherein the transmission module further transmits the phone number to the preset destination communication device.

7. The communication device of claim 6, wherein the personal data further comprises a short message service (SMS), and e-mail content.

8. The communication device of claim 7, wherein the transmission module transmits the contacts information of the address book to the preset destination communication device using vCard format.

9. A non-transitory storage medium having stored thereon instructions that, when executed by a processor, causing the processor to perform a method of data protection for a communication device, wherein the method comprises:
   reading a phone number of a subscriber identity module (SIM) card received in the communication device;
   determining whether the phone number conforms to a preset phone number stored in the communication device;
   locking personal data stored in the communication device to conceal the personal data, and transmitting contacts information of address book in the personal data to a preset destination communication device, upon condition that the phone number does not conform to the preset phone number; and
   transmitting a warning and location information of the communication device to the preset destination communication device over a communication network.

10. The non-transitory storage medium of claim 9, wherein the method further comprises:
   transmit the phone number to the preset destination communication device upon condition that the phone number does not conform to the preset phone number.

11. The non-transitory storage medium of claim 10, wherein the personal data further comprises a short message service (SMS), and e-mail content.

12. The non-transitory storage medium of claim 11, wherein the method further comprises:

transmitting the contacts information of the address book to the preset destination communication device using vCard format.

\* \* \* \* \*